(12) United States Patent
Hart

(10) Patent No.: US 6,439,512 B1
(45) Date of Patent: Aug. 27, 2002

(54) ALL-HYDRAULIC POWERED HORIZONTAL STABILIZER TRIM CONTROL SURFACE POSITION CONTROL SYSTEM

(75) Inventor: Kenneth Edward Hart, Simi Valley, CA (US)

(73) Assignee: HR Textron, Inc., Valencia, CA (US)

( * ) Notice: Subject to any disclaimer, the term of this patent is extended or adjusted under 35 U.S.C. 154(b) by 58 days.

(21) Appl. No.: 09/645,188

(22) Filed: Aug. 24, 2000

(51) Int. Cl.$^7$ .................................................. G05D 1/10
(52) U.S. Cl. ....................................................... 244/178
(58) Field of Search ................................ 244/178, 177, 244/191, 78, 76 A, 221, 226, 229

(56) References Cited

U.S. PATENT DOCUMENTS

| | | |
|---|---|---|
| 992,729 A | 5/1911 | Merrege |
| 2,947,286 A | 8/1960 | Baltus et al. |
| 2,953,329 A | 9/1960 | Ciscel |
| 2,990,144 A | 6/1961 | Hougland |
| 3,131,603 A | 5/1964 | Hadekel |
| 3,143,925 A | 8/1964 | Wolpin |
| 3,679,156 A * | 7/1972 | Redmond, Jr. ............... 244/194 |
| 3,750,532 A | 8/1973 | Kubilos |
| 3,794,276 A | 2/1974 | Maltby et al. |
| 3,812,806 A | 5/1974 | Korotkov et al. |
| 4,133,250 A | 1/1979 | Heintz |
| 4,177,713 A | 12/1979 | Lewis et al. |
| 4,205,590 A | 6/1980 | Stegner |
| 4,231,284 A | 11/1980 | Smith et al. |
| 4,671,166 A * | 6/1987 | Glaze et al. .................. 91/361 |
| 4,744,532 A * | 5/1988 | Ziegler et al. ............. 244/75 R |
| 4,807,517 A | 2/1989 | Daeschner |
| 4,840,031 A | 6/1989 | Hribar |
| 4,972,915 A | 11/1990 | Suketomo et al. |
| 5,074,495 A | 12/1991 | Raymond |
| 5,343,703 A * | 9/1994 | Kamimura .................... 60/403 |
| 5,848,612 A | 12/1998 | Currey |

* cited by examiner

Primary Examiner—Peter M. Poon
Assistant Examiner—Kevin Jakel
(74) Attorney, Agent, or Firm—Fulbright & Jaworski L.L.P.

(57) ABSTRACT

A control system utilizes hydraulic power only to control a fixed-wing aircraft horizontal stabilizer trim control surface with no electrical control devices except for a cockpit pilot/co-pilot initiated 3-position spring-centered toggle trim switch, a backup electrical motor and a standard electronic logic pilot interface. The toggle trim switch controls two solenoid valves which control the operation of a directional control valve. The control system also includes a hydraulic motor, a rate control valve, a blocking-bypass valve, a shutoff valve with an integrated position sensor and a gear set driving an acme threaded output shaft for elevating or lowering the horizontal stabilizer trim control surface on command by the pilot. The control system controls the horizontal stabilizer trim control surface angular displacement rate as a function of angular position by means of a mechanical feedback linkage between the spool of the rate control valve and the horizontal stabilizer trim control surface. The sleeve of the rate control valve has a variable outflow area slot to control the hydraulic flow rate to the motor ports of the hydraulic motor. The horizontal stabilizer trim control surface is automatically stopped at predetermined maximum-up/maximum-down positions by means of a mechanical feedback linkage between the horizontal stabilizer trim control surface and the spool of the shutoff valve. If the mechanical feedback linkage between the rate control valve spool and the horizontal stabilizer trim control surface malfunctions, the rate control valve automatically reverts to a default fixed flow rate which translates into a corresponding fixed horizontal stabilizer trim control surface angular displacement rate.

25 Claims, 7 Drawing Sheets

ALL-HYDRAULIC POWERED HORIZONTAL STABILIZER TRIM CONTROL SURFACE POSITION CONTROL SYSTEM

BACKGROUND OF THE INVENTION

1. Field of the Invention

The present invention relates generally to hydraulic control systems and more particularly to an all-hydraulic horizontal stabilizer trim control surface position control system for use on a fixed-wing aircraft.

2. Prior Art

Fixed-wing aircraft horizontal stabilizer control surfaces typically require position trimming by the pilot to respond to certain aircraft flight conditions such as takeoff, in-flight and landing. Various means of accomplishing horizontal stabilizer trim surface control have been utilized on a variety of fixed-wing aircraft such as electromechanical, electrohydraulic and mechanical trim control systems. Adjusting the angular position of the horizontal stabilizer trim control surface aids in the pitch control of the aircraft.

In one type of fixed-wing aircraft, the movement of the horizontal stabilizer, located adjacent to the vertical stabilizer and hinged at the rear spar to permit up and down trim movement of the leading edge, may be provided by an electrical trim control system. Means for indicating the travel/position of the horizontal stabilizer in degrees may also be included. The common modes of electrical trim control operation are autopilot trim and manual electrical trim. The autopilot trim allows automatic trimming of the horizontal stabilizer when the autopilot system is engaged. The manual electrical trim provides pilot control of the horizontal stabilizer trim by means of a cockpit toggle trim switch on the control wheel. Actuation of the switch disengages the automatic flight control system and allows the pilot to manually adjust the angular position of the horizontal stabilizer trim control surface. In this case, placing the pilot's toggle switch in the nose-up position usually energizes a nose-up relay and drives the trim actuator (via the actuator control unit) to the desired nose-up position. Nose-down trim is achieved in a similar manner using a nose-down relay. The trim actuator generally includes an electric motor, brake, clutch, reduction gear train, mechanical input shaft, limit switches and a position transmitter. The electrical motor drives the reduction gear train via the clutch. When the motor is turned on, the brake releases the motor shaft. The mechanical input shaft provides a means of driving the actuator gear train from an external source. The position transmitter (e.g., potentiometer) provides position information to the actuator control unit which amplifies the signal and transmits the same to the horizontal stabilizer trim position indicator in the cockpit.

Electro-hydraulic trim control systems may be intermittent duty or continuous duty systems in which some hydraulic fluid pressure is always applied to the trim actuator attached to the control surface. Control surface positional changes are made by altering the pressure differential applied to the associated actuator. Many of these control systems include some type of feedback arrangement to allow precision surface position control.

A trim control system of this type is shown, for example, in U.S. Pat. No. 4,840,031 to Hribar which deals with a control system for an actuator used to position a control surface on an aircraft such as a horizontal stabilizer. The control system includes a source of pressurized hydraulic fluid, a pressure control for establishing a predetermined pressure level that is substantially one-half source pressure, a blocker valve and a direction control valve for controlling the application of fluid pressure to the actuator. When idle, the blocker valve supplies substantially equal control pressures to the actuator so that the control system remains pressurized to substantially one-half source pressure. When the actuator is being energized, the direction control valve determines the direction of actuation and the blocker valve controls the fluid flow rate to and from the actuator to maintain a constant actuation rate regardless of load. A servo mechanism monitors return flow across an orifice and adjusts the position of a blocker valve element in order to throttle both the input and return fluid flows to the actuator as a function of the return fluid flow rate.

The above-described trim control systems are fairly complex systems which commonly provide performance at the expense of reliability. Reliability of control systems of this type and especially of horizontal stabilizer trim control systems has been an issue of growing concern for quite some time for aircraft manufacturers and pilots alike. In particular, failures and/or near-failures of horizontal stabilizer trim control systems have been occurring lately at an alarming rate.

Therefore, the need arises for a reliable, preferably all-hydraulic horizontal stabilizer trim control system which may be utilized in a variety of fixed-wing aircraft. A control system of this kind may include a primary hydraulic motor, a backup electrical motor, hydraulic valves and a gear train for proportional adjustment of the angular position of the horizontal stabilizer control surface and for coupling the two motors. One of the valves may be a spool-and-sleeve rate control valve for proportionally controlling the flow rate to the hydraulic motor ports based on actual control surface position. Proportional flow rate control may be achieved by mechanical feedback means in the form of a linkage between the horizontal stabilizer control surface and the spool of the rate control valve. In case of mechanical feedback failure, the rate control valve spool would be automatically repositioned to allow a pre-determined default hydraulic flow rate to the motor ports of the hydraulic motor. An all-hydraulic horizontal stabilizer trim control system of this type will provide a viable solution to the above-described problems of the prior art.

SUMMARY OF THE INVENTION

The present invention is directed to a horizontal stabilizer trim control surface position control system for use by a pilot on an aircraft, comprising a trim controller for controlling the angular position of the horizontal stabilizer trim control surface on command by the pilot, the trim controller powered substantially by pressurized hydraulic fluid; a trim actuator operatively coupled between the trim controller and the horizontal stabilizer trim control surface for adjusting the angular position of the horizontal stabilizer trim control surface on command by the pilot, the trim actuator driven by the trim controller; and means for providing feedback on the angular position of the horizontal stabilizer trim control surface to the pilot.

The trim controller includes a plurality of spool-and-sleeve hydraulic valves, each of the spool-and-sleeve hydraulic valves having a plurality of inlet and outlet ports for flowing pressurized hydraulic fluid. The plurality of spool-and-sleeve hydraulic valves includes a rate control valve, a directional control valve hydraulically coupled to the rate control valve, a blocking-bypass valve hydraulically coupled to the directional control valve and a shutoff valve hydraulically coupled to the blocking-bypass valve, the rate control valve operatively coupled to on-board aircraft hydraulic system supply and return lines.

Means for driving the directional control valve is provided. The directional control valve driving means includes a first solenoid valve operatively coupled to one end of the directional control valve and a second solenoid valve operatively coupled to another end of the directional control valve, the first and second solenoid valves actuated by the pilot.

Means for actuating the first solenoid valve and the second solenoid valve by the pilot is also provided. The actuating means includes a toggle trim switch for selectively actuating the first solenoid valve and the second solenoid valve by the pilot through a pilot interface operatively coupled between the toggle trim switch and the first and second solenoid valves, the toggle trim switch and the pilot interface powered by an on-board aircraft power source.

In accordance with one aspect of the present invention, the trim actuator comprises at least one motor having a motor shaft, a first gear train driven by the motor shaft and means for adjusting the angular position of the horizontal stabilizer trim control surface on command by the pilot. The angular position adjusting means includes an output shaft operatively coupled between the horizontal stabilizer trim control surface and the first gear train, the output shaft driven by the first gear train, the driven output shaft having linear displacement, the linear displacement adjusting the angular position of the horizontal stabilizer trim control surface on command by the pilot.

The motor may be a hydraulic motor having a first motor port and a second motor port, the first and second motor ports hydraulically coupled to some of the ports of the shutoff valve, the shutoff valve controlling the flow of pressurized hydraulic fluid to the first and second motor ports. The first gear train comprises a pinion gear driven by the motor shaft of the hydraulic motor, a spur gear driven by the pinion gear and a first worm gear set driven by the spur gear.

The first worm gear set comprises a worm driven by the spur gear and a worm gear driven by the worm, the output shaft driven by the worm gear, the output shaft linear displacement resulting from the worm gear driving the output shaft.

In accordance with another aspect of the present invention, means for providing feedback on the angular position of the horizontal stabilizer trim control surface to the rate control valve is provided. The rate control valve feedback means includes a second gear train driven by the first gear train and operatively coupled to a feedback shaft, the feedback shaft coupled to the spool of the rate control valve for linearly displacing the spool of the rate control valve inside the sleeve of the rate control valve substantially in proportion to the linear displacement of the output shaft.

The second gear train comprises a bevel gear set driven by the first gear train and a second worm gear set driven by the bevel gear set, the feedback shaft driven by the second worm gear set. The bevel gear set comprises a first bevel gear driven by the worm gear and a second bevel gear driven by the first bevel gear. The second worm gear set comprises a second worm driven by the second bevel gear and a worm gear segment operatively coupled between the second worm and the feedback shaft for driving the feedback shaft substantially in proportion to the linear displacement of the output shaft.

In accordance with yet another aspect of the present invention, means for controlling the flow rate of pressurized hydraulic fluid to the first and second motor ports of the hydraulic motor is provided. The flow rate control means includes a groove on the spool of the rate control valve for passing outflowing pressurized hydraulic fluid from the spool and at least one outlet flow slot on the sleeve of the rate control valve for accommodating the outflowing pressurized hydraulic fluid from the spool groove, the at least one sleeve outlet flow slot providing a variable pressurized hydraulic fluid outflow area for varying the pressurized hydraulic fluid flow rate to the first and second motor ports of the hydraulic motor substantially in proportion to the angular rate of displacement of the horizontal stabilizer trim control surface.

In accordance with a still another aspect of the present invention, means for providing feedback on the angular position of the horizontal stabilizer trim control surface to the shutoff valve is provided. The shutoff valve feedback means includes the second gear train driven by the first gear train and operatively coupled to the feedback shaft, the feedback shaft coupled to the spool of the shutoff valve for linearly displacing the spool of the shutoff valve inside the sleeve of the shutoff valve substantially in proportion to the linear displacement of the output shaft.

In accordance with a different aspect of the present invention, the means for providing feedback on the angular position of the horizontal stabilizer trim control surface to the pilot includes a horizontal stabilizer trim control surface position sensor operatively coupled to the spool of the shutoff valve, the horizontal stabilizer trim control surface position sensor powered by an on-board aircraft power source.

In accordance with a still different aspect of the present invention, a backup electric motor may be included for use during loss of hydraulic system supply pressure, the pilot interface automatically actuating the backup electric motor during loss of hydraulic system supply pressure, the backup electric motor powered by an on-board aircraft power source. In this case, the first gear train would include a pinion gear driven by the motor shaft of the backup electric motor, a spur gear driven by the pinion gear with the first worm gear set driven by the spur gear.

These and other aspects of the present invention will become apparent from a review of the accompanying drawings and the following detailed description of the preferred embodiments of the present invention.

DETAILED DESCRIPTION OF THE PREFERRED EMBODIMENTS

Hereinafter, some preferred embodiments of the present invention will be described in detail with reference to the related drawings of FIGS. 1–7. Additional embodiments, features and/or advantages of the invention will become apparent from the ensuing description or may be learned by the practice of the invention.

The following description includes the best mode presently contemplated for carrying out the invention. This description is not to be taken in a limiting sense, but is made merely for the purpose of describing the general principles of the invention.

The present invention includes a control system which utilizes hydraulic power only to control the angular position of a fixed-wing aircraft horizontal stabilizer trim control surface and has no electronic control devices except for a standard pilot/co-pilot initiated 3-position spring-centered toggle trim switch electrically connected to a conventional electronic logic pilot interface. The toggle trim switch controls two standard 3-way, 2-position solenoid valves which control the operation of a directional control valve via the pilot interface. The control system is capable of proportional infinite position control of the horizontal stabilizer trim control surface and generally includes a hydraulic motor, a rate control valve, a directional control valve, a blocking-bypass valve, a shutoff valve, a position sensor and a gear set driving an acme threaded output shaft attached to the horizontal stabilizer trim control surface for elevating or lowering the same on command from the pilot/co-pilot. The control system includes a horizontal stabilizer trim control surface position feedback means to vary the horizontal stabilizer trim control surface angular displacement rate as a function of angular position whereby the horizontal stabilizer trim control surface automatically stops at pre-determined maximum-up/maximum-down positions. In case of hydraulic failure or loss of signal to the solenoid valves, the control system automatically reverts to a balanced hydraulic condition which allows a built-in backup electric motor (coupled to the hydraulic motor via the gear set) to take over and control the angular position of the horizontal stabilizer trim control surface electrically. In such a case, the electronic logic in the pilot interface is set up to automatically divert the toggle trim switch signal from the solenoid valves to the backup electric motor. If the horizontal stabilizer trim control surface position feedback means malfunctions, the control system automatically reverts to a pre-determined (default) fixed horizontal stabilizer trim control surface angular displacement rate.

Figure 1:
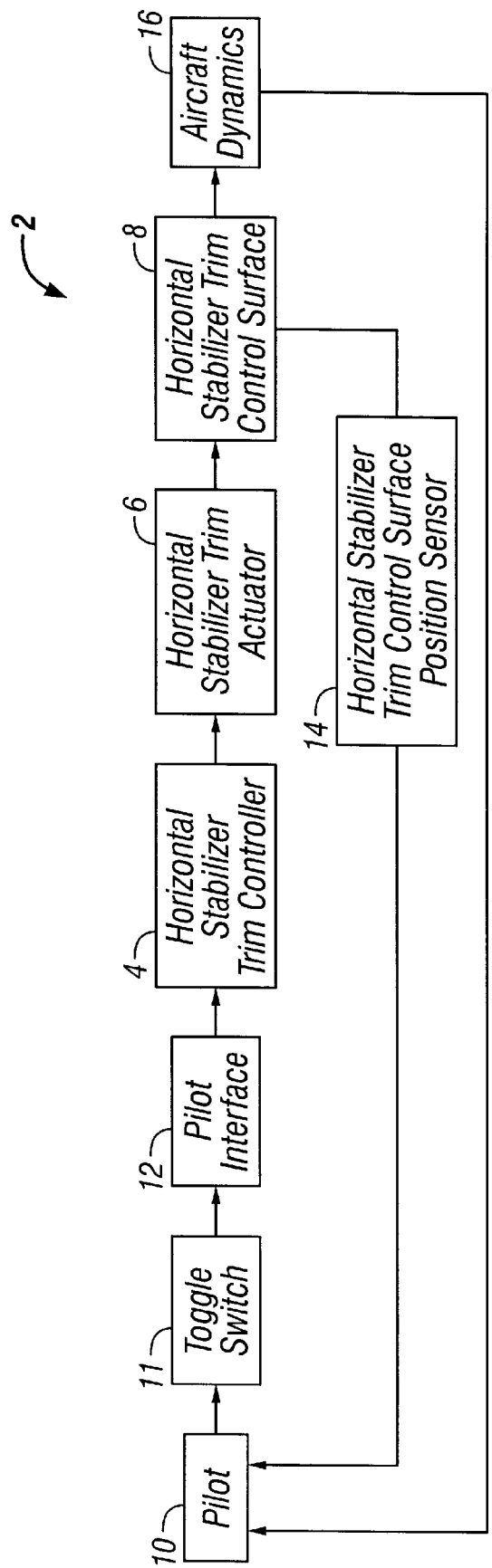
FIG. 1 is a block diagram of a horizontal stabilizer trim control system in accordance with the present invention.

Referring now more particularly to FIG. 1, a control system, generally referred to by reference numeral 2, is shown for use in accordance with the general principles of the present invention. Control system 2 comprises a horizontal stabilizer trim controller 4 driving a horizontal stabilizer trim actuator 6 which varies the angular position of a horizontal stabilizer trim control surface 8 in response to a command from an aircraft pilot 10 via a standard 3-position (up, neutral, down) toggle trim switch 11 (see also FIG. 7) and a conventional electronic logic pilot interface 12. Pilot interface 12 is electrically connected between toggle trim switch 11 and horizontal stabilizer trim controller 4, i.e. it receives electrical input from toggle trim switch 11 and outputs appropriate electrical signals to horizontal stabilizer trim controller 4 in accordance with the general principles of the present invention. Pilot interface 12 and toggle trim switch 11 are powered by on-board aircraft power source.

Pilot 10 receives feedback on the angular position of horizontal stabilizer trim control surface 8 from a horizontal stabilizer trim control surface position sensor 14. Horizontal stabilizer trim control surface position sensor 14 may be a standard linear variable differential transformer (LVDT), a resolver, a rotary variable differential transformer (RVDT) position sensor or the like. Pilot 10 also receives feedback from aircraft dynamics 16, i.e. a change in position of horizontal stabilizer trim control surface 8 would normally alter aircraft dynamics 16 which can be readily sensed by pilot 10.

Figure 2:
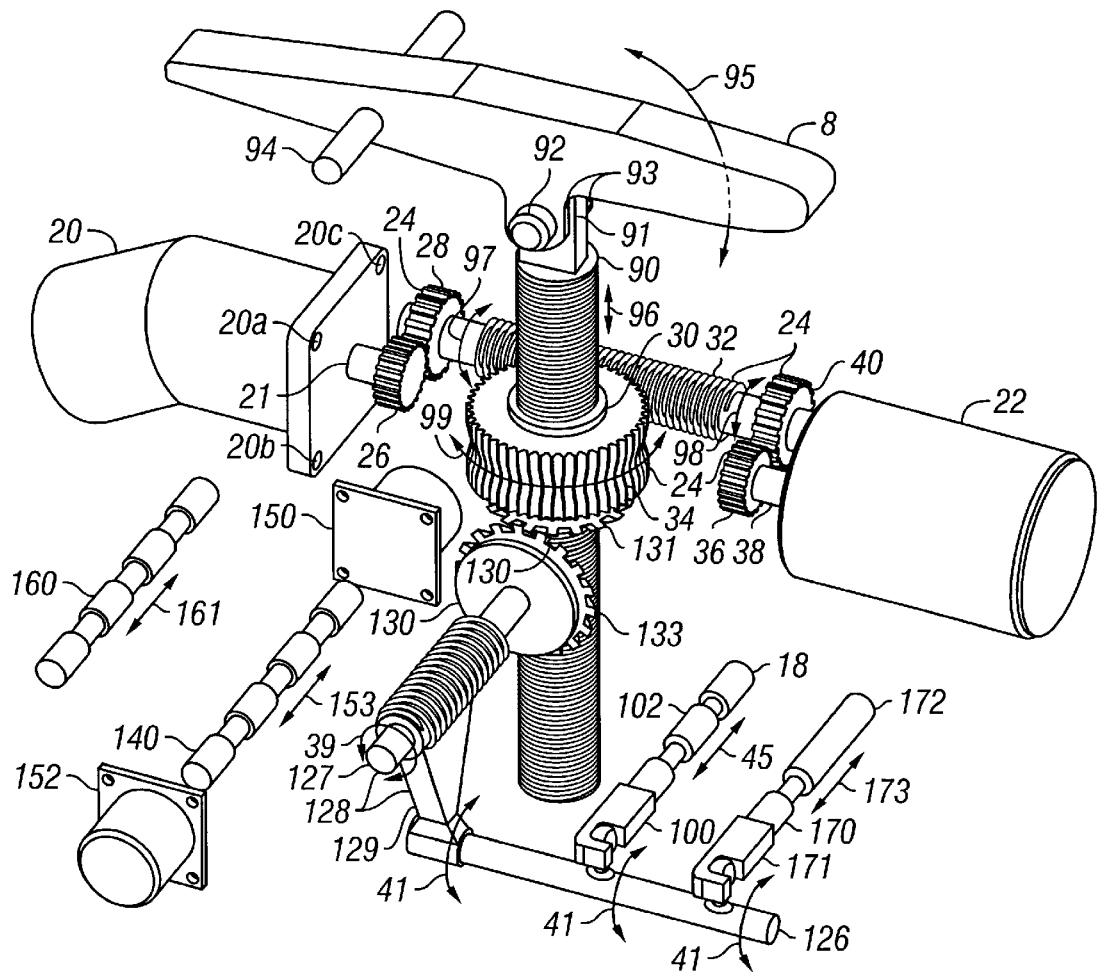
FIG. 2 is a perspective view of the main hydraulic components of the horizontal stabilizer trim control system of FIG. 1 in accordance with the present invention.
Figure 3:
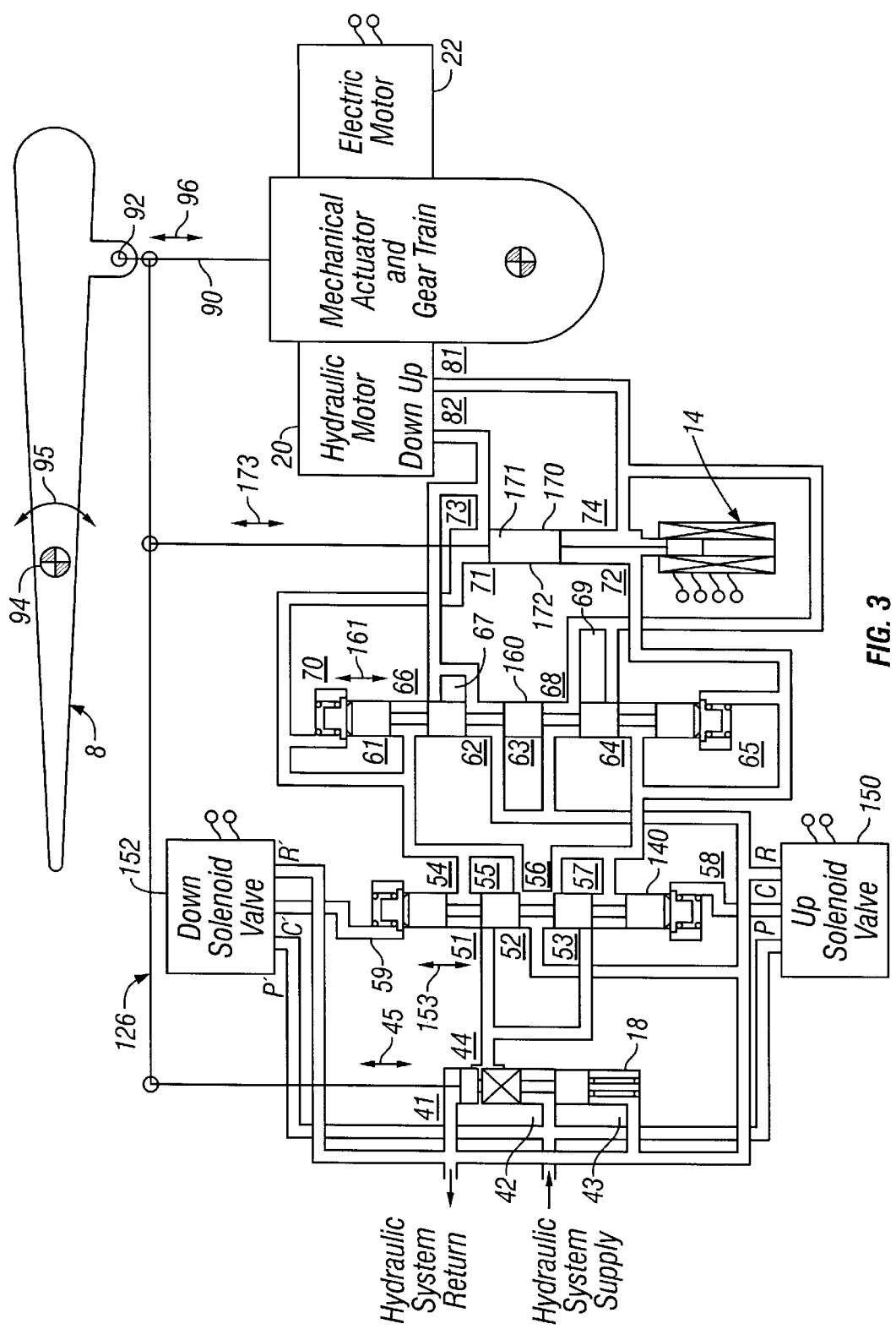
FIG. 3 is a schematic representation of an all-hydraulic horizontal stabilizer trim control system in accordance with the present invention.

As illustrated in FIGS. 2 and 3, horizontal stabilizer trim actuator 6 preferably includes a conventional bent-axis fixed-displacement piston-type hydraulic motor 20 driven by pressurized hydraulic fluid supplied from an on-board aircraft hydraulic system supply line through a series of hydraulic valves. Hydraulic motor 20 has a motor shaft 21 and two motor ports—"up" motor port 81 (FIG. 3) and "down" motor port 82 (FIG. 3). Hydraulic motor 20 is mounted on an aircraft structural surface (not shown) via four bolts 20a, 20b, 20c (fourth bolt not shown). Pressurized hydraulic fluid flows in one motor port (81 or 82) and out of the other motor port (82 or 81) depending on whether an "up" or "down" command is received from pilot 10. There is no flow of pressurized hydraulic fluid through motor ports 81, 82 when a "stop" command is received from pilot 10 and at the pre-determined "maximum up" and "maximum down" positions of horizontal stabilizer trim control surface 8.

Horizontal stabilizer trim actuator 6 also includes a backup electric motor 22 (FIG. 2) which is coupled to hydraulic motor 20 via a first gear train 24 as shown in FIG. 2 and powered by on-board aircraft power source. Following loss of hydraulic system pressure, motor ports 81 and 82 are interconnected to system return allowing backup electric motor 22 to take over the control operation. In such a case, electric motor 22 backdrives hydraulic motor 20 in accordance with the general principles of the present invention. Each motor (20, 22) is controlled by pilot 10 via the 3-position toggle trim switch 11 and pilot interface 12 with the electronic logic in conventional pilot interface 12 automatically switching the pilot control signal to backup electric motor 22 following a general hydraulic failure. In such case, pilot 10 controls the position of horizontal stabilizer trim control surface 8 electrically and overtravel stops may be provided to stop horizontal stabilizer trim control surface 8 at maximum up and down positions since hydraulic maximum up and down position control would not be functional.

Another component of horizontal stabilizer trim actuator 6 is first gear train 24 which comprises a pinion gear 26 driven by motor shaft 21 of hydraulic motor 20, a spur gear 28 driven by pinion gear 26 and a dual-load path worm gear set 30. Worm gear set 30 includes a worm 32 driven by spur gear 28 in an angular fashion as shown by arrow 97 in FIG. 2 and a worm gear, 34 driven by worm 32 in an angular fashion as shown by arrow 99 in FIG. 2. Worm gear set 30 mechanically transmits motor power output to an acme threaded output shaft 90 (FIG. 2) which is yet another component of horizontal stabilizer trim actuator 6.

Acme threaded output shaft 90 is removably attached to horizontal stabilizer trim control surface 8 via a lug 91, a retaining pin or bolt 92 and is anti-rotated by a mating horizontal stabilizer trim control surface clevis 93 (FIG. 2). Horizontal stabilizer trim control surface 8 is pivoted on a horizontal stabilizer surface-to-aircraft structural pivot 94 (FIG. 2) and is moved up or down in a limited angular fashion as shown by arrow 95 in FIG. 2 by the output end of acme threaded shaft 90 which advances or retracts in a linear fashion as shown by arrow 96 in FIG. 2.

In accordance with the general principles of the present invention, no physical stops are provided (or needed) at each end of acme threaded output shaft 90 to restrict its linear motion (FIG. 2) when the position of hydraulic stabilizer trim control surface 8 is controlled hydraulically. However, as briefly mentioned hereinabove, when backup electric motor 22 is operational, physical stops must be provided (not shown) on shaft 90 to allow for "maximum-up" and "maximum-down" positions for horizontal stabilizer trim control surface 8. First gear train 24 also comprises a pinion gear 36 driven by motor shaft 38 of backup electric motor 22 and a spur gear 40 driven by pinion gear 36. Spur gear 40 drives worm 32 in an angular fashion as shown by arrow 98 in FIG. 2.

The combination of acme threaded output shaft 90 and worm gear set 30 provides the necessary horizontal stabilizer trim control surface position irreversibility under in-service load and vibration conditions which prevents external loads from backdriving hydraulic motor 20 or electric motor 22 in either direction in accordance with the general principles of the present invention.

As shown in FIG. 3, horizontal stabilizer trim controller 4 includes an infinite position spool-and-sleeve flow rate control valve 18 which controls the hydraulic flow rate to motor ports 81, 82. Rate control valve 18 has an inlet port 42 for receiving pressurized hydraulic fluid from a hydraulic system supply line (not shown), return ports 41, 43 and an outlet port 44. The operation of each port is described in detail hereinbelow in tabular form.

Figure 4:
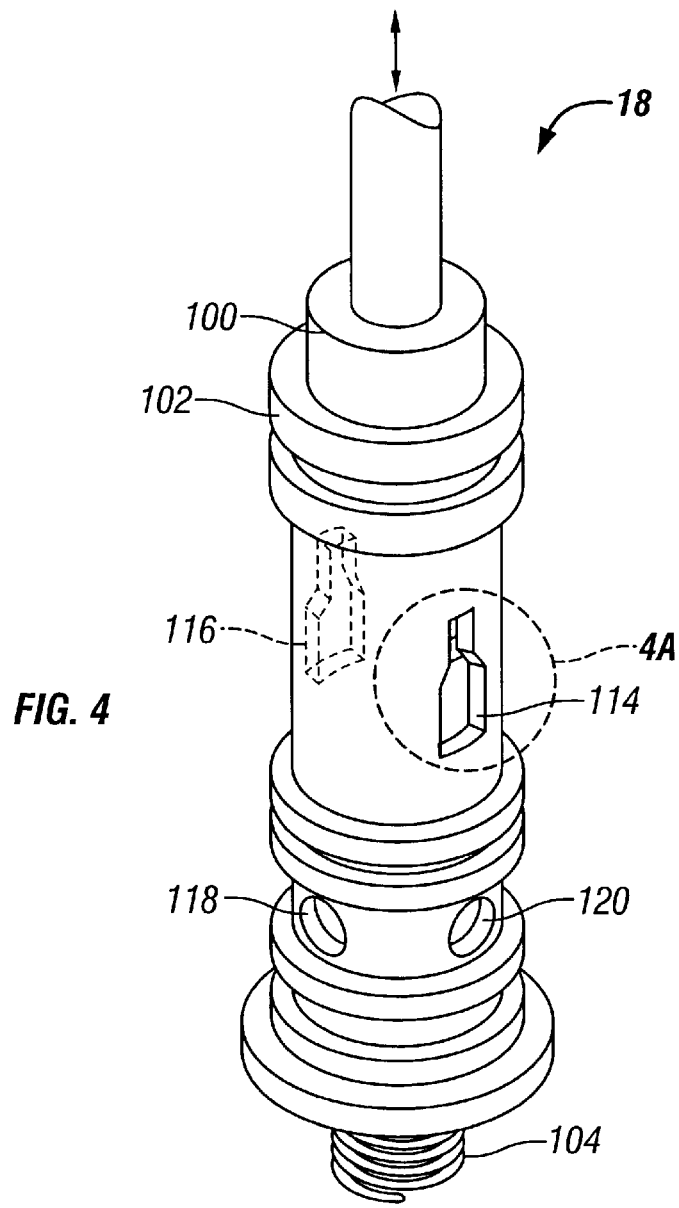
FIG. 4 is a perspective view of a rate control valve used in the all-hydraulic horizontal stabilizer trim control system of FIG. 3 in accordance with the present invention.
Figure 4A:
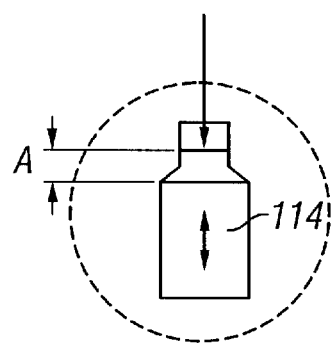
Figure 5:
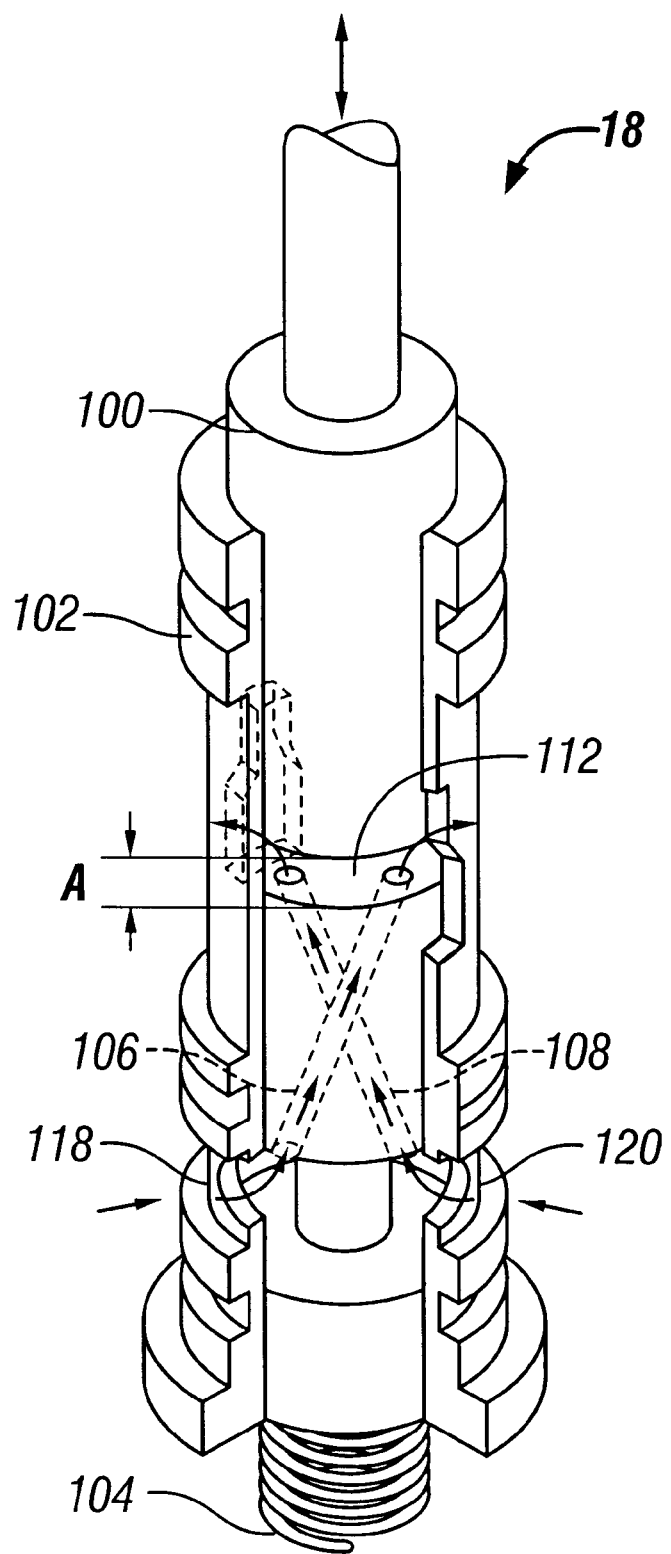
FIG. 5 is a partial cut out view of the rate control valve of FIG. 4 in accordance with the present invention.
Figure 6:
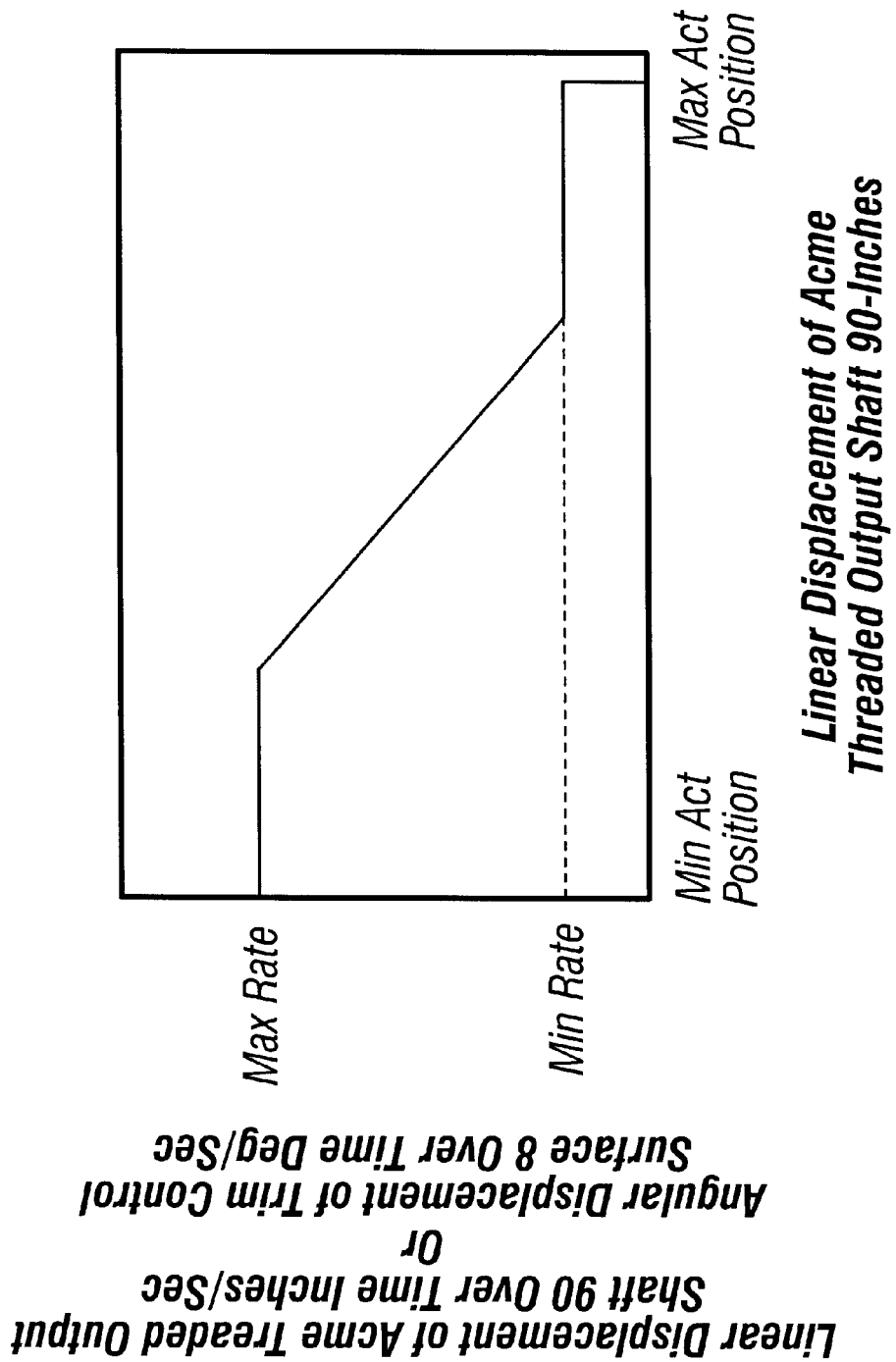
FIG. 6 is an operational graph illustrating a preferred embodiment of the present invention.
Figure 7:
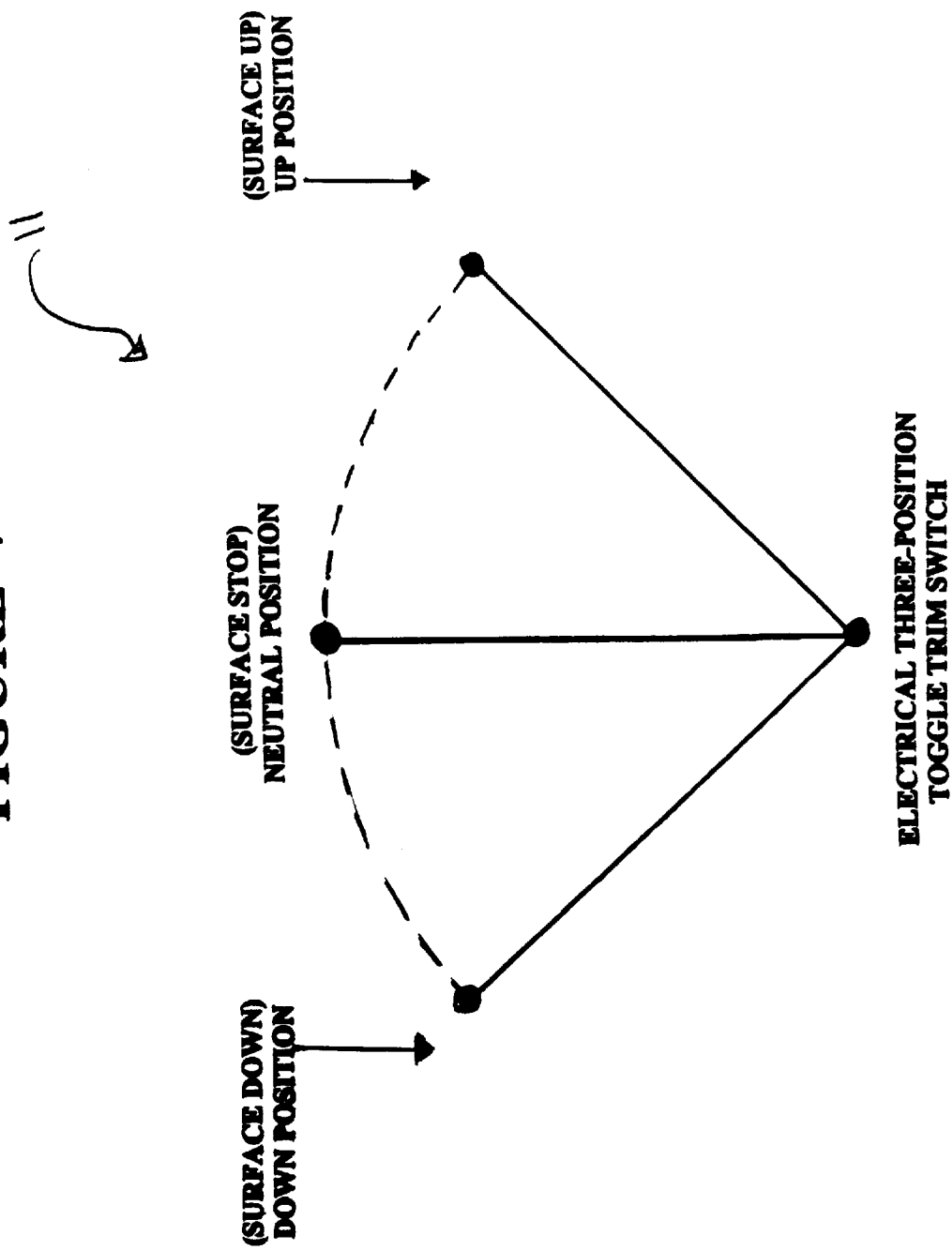
FIG. 7 is a schematic operational representation of one of the components of the horizontal stabilizer trim control system of FIG. 1 in accordance with the present invention.

In accordance with a preferred embodiment of the present invention and as further shown in FIGS. 4–5, rate control valve 18 comprises a spool 100 which slides linearly inside a sleeve 102 and a pre-loaded spring 104 conventionally attached to spool 100. Spool 100 preferably includes three generally elongated internal non-overlapping flow passages 106, 108 (third flow passage not shown) disposed about 120° apart as shown in FIG. 5 for receiving inflowing pressurized hydraulic fluid. Spool 100 also preferably includes a generally annular groove 112 which has a width A for accommodating outflowing (such as from internal flow passages 106, 108) pressurized hydraulic fluid as shown in FIG. 5.

In accordance with another preferred embodiment of the present invention and as shown in FIG. 4, sleeve 102 is provided with a pair of generally upright bottle-shaped outlet flow slots 114, 116 disposed about 180° apart for accommodating outflowing pressurized hydraulic fluid (such as from internal passages 106, 108). Sleeve 102 is also provided with four inlet flow slots 118, 120 (third and fourth inlet flow slots not shown) spaced about 90° apart (FIGS. 4, 5) for accommodating inflowing pressurized hydraulic fluid from the hydraulic system supply line to inlet port 42 (FIG. 3).

In accordance with the best mode for practicing the present invention, one end of spool 100 is attached to a feedback shaft 126 (FIGS. 2, 3) driven by a second gear train which includes a worm gear set 128 driven by a bevel gear set 130 as shown in FIG. 2. Attachment between spool 100 and feedback shaft 126 may be accomplished in a number of ways provided that the coupling configuration allows spool 100 to operate without binding. In accordance with the general principles of the present invention, a linear fluid seal is required at each end of feedback shaft 126 for load balancing, spool-sleeve lap leakage capturing and minimal operational friction.

Worm gear set 128 includes a worm 127 attached to a worm gear segment 129 which in turn is attached (e.g., splined) to one end of feedback shaft 126 as shown in FIG. 2. Other ways of attaching one end of feedback shaft 126 to worm gear segment 129 may be utilized, provided such types of attachment do not deviate from the intended purpose of the present invention. Alternatively, worm gear segment 129 and feedback shaft 126 may be an integral unit capable of functioning in accordance with the general principles of the present invention.

Bevel gear set 130 includes bevel gears 131, 133 as shown in FIG. 2. Bevel gear 131 is driven by worm gear 34 and (vertical) bevel gear 133 is driven by bevel gear 131 (FIG. 2). Bevel gear 133 drives worm 127 in angular fashion as shown by arrow 39 in FIG. 2. Worm 127 in turn causes worm gear segment 129 to drive mechanical feedback shaft 126 respectively in an angular fashion as shown by arrows 41 in FIG. 2. Since feedback shaft 126 is attached to spool 100 of rate control valve 18 (FIG. 2), the angular motion of shaft 126 imparts corresponding linear motion on spool 100 as shown by arrow 45 in FIG. 2 with spool 100 sliding linearly inside sleeve 102 of valve 18 (FIGS. 4 and 5).

Furthermore, as worm gear 34 moves in an angular fashion—arrow 99 in FIG. 2—(being prevented from moving along the acme threaded output shaft 90 centerline) it causes acme threaded output shaft 90 to move linearly up and down (linear displacement) which results in a variation of the angular position of horizontal stabilizer trim control surface 8 (FIG. 2). Thus, a direct mechanical feedback from acme threaded output shaft 90 to spool 100 of hydraulic rate control valve 18 is achieved with the linear displacement of output shaft 90 being preferably proportional to the resulting linear displacement of spool 100 inside sleeve 102 in accordance with the present invention.

For example, the final stage of worm gear segment 129 may provide approximately 45° to 60° angular motion which would be roughly equivalent to the total acme threaded output shaft linear stroke. The combination of worm gear set 128 and bevel gear set 130 is chosen to provide the necessary gear reduction to achieve the above-mentioned proportionality. As acme threaded output shaft 90 advances linearly up and down (arrow 96 in FIG. 2) adjusting the angular position of horizontal stabilizer trim control surface 8 on command by the pilot, spool 100 is forced by feedback shaft 126 to slide linearly inside sleeve 102 accordingly (FIG. 4 and 5). The corresponding linear motion of spool 100 inside sleeve 102 varies the disposition of spool outflow groove 112 relative to sleeve outlet flow slots 114, 116 (FIGS. 4,5) providing in effect a variable exposed outflow area, as shown for example in exploded view 400 of bottle-shaped sleeve outlet flow slot 114 (FIG. 4). A variable exposed outflow area translates into a variable flow rate to motor port 81 or motor port 82 of hydraulic motor 20 with the flow rate being proportional to the angular rate of displacement of horizontal stabilizer trim control surface 8. The functional relationship between horizontal stabilizer trim actuator rate (linear displacement of acme threaded output shaft 90 over time–inches/sec which corresponds to the angular displacement of horizontal stabilizer trim control surface 8 over time–degrees/sec) and horizontal stabilizer trim actuator position (linear displacement of acme threaded output shaft 90–inches) for the generally upright 'bottle'-shaped sleeve outlet flow slot 114 is graphically shown in FIG. 6. In this case, a minimum actuator position corresponds to maximum actuator rate and a maximum actuator position corresponds to a minimum actuator rate. In other words, if horizontal stabilizer trim control surface 8 is at "maximum up" position and pilot 10 commands a down movement for horizontal stabilizer trim control surface 8, horizontal stabilizer trim control surface 8 will move away from the "maximum up" position relatively slow. Conversely, if horizontal stabilizer trim control surface 8 is at "maximum down" position and pilot 10 commands an upward movement for horizontal stabilizer trim control surface 8, horizontal stabilizer trim control surface 8 will move away from the "maximum down" position relatively fast. To this end, it should be appreciated by a person skilled in the art that the shape of sleeve outlet flow slot 114 is not limited to the above-described upright 'bottle" shape but may be varied as needed, provided such shape variations do not depart from the intended purpose and scope of the present invention.

If the mechanical coupling between feedback shaft 126 and spool 100 of rate control valve 18 fractures and provided spool 100 does not jam inside sleeve 102, spool 100 will automatically reposition itself due to spring action from pre-loaded spring 104 to a pre-determined default position in accordance with the present invention. The default position preferably would provide a minimal flow rate to motor port 81 or motor port 82 of hydraulic motor 20 which in turn would translate to a fixed minimal default angular horizontal stabilizer trim control surface displacement rate. Other default flow rate arrangements may be utilized, provided such flow rate arrangements do not depart from the intended scope and spirit of the present invention.

Horizontal stabilizer trim controller 4 also includes a 4-way, 3-position lap fit spool and sleeve directional control valve 140 which is hydraulically coupled to rate control valve 18 and operated by a pair of 3-way, 2-position solenoid valves, i.e. up solenoid valve 150 and down solenoid valve 152 mounted conventionally at each end of directional control valve 140 (FIG. 3). The solenoid valves are controlled by pilot 10 via 3-position electrical toggle trim switch 11 (FIGS. 1, 7) and pilot interface 12. The electronic logic in pilot interface 12 receives electrical input from toggle trim switch 11 and outputs appropriate electrical signals to solenoid valves 150, 152 to energize/de-energize the same depending on pilot command. Up solenoid valve 150 has an inlet port P for receiving pressurized hydraulic fluid, a control port C for driving the spool of directional control valve 140 and a return port R to complete the hydraulic circuit. Down solenoid valve 152 in turn has an inlet port P' for receiving pressurized hydraulic fluid, a control port C' for driving the spool of directional control valve 140 and a return port R' to complete the hydraulic circuit. The spool of directional control valve 140 slides linearly in the sleeve of directional control valve 140 as shown by arrow 153 in FIG. 3. Directional control valve 140 has nine ports 59, 51, 52, 53, 58, 57, 56, 55 and 54 (FIG. 3), with the operation of each port described in detail hereinbelow in tabular form.

When pilot 10 turns toggle trim switch 11 to 'up' position (FIG. 7), up solenoid 150 is energized and down solenoid 152 is de-energized to achieve the desired upward angular displacement of horizontal stabilizer trim control surface 8. Conversely, when pilot 10 turns toggle trim switch 11 to 'down' position (FIG. 7), up solenoid 150 is de-energized and down solenoid 152 is energized to achieve the desired downward angular displacement of horizontal stabilizer trim control surface 8. When pilot 10 returns toggle trim switch 11 to 'neutral' position (FIG. 7), both solenoid valves are de-energized, both ends of directional control valve 140 are ported to return pressure effectively pressure-balancing directional control valve 140, the spool of directional control valve 140 returns to a neutral (centered) position by means of one of its centering springs (FIG. 3) and horizontal stabilizer trim control surface 8 stops in the desired position.

As further shown in FIG. 3, horizontal stabilizer trim controller 4 also includes a blocking-bypass valve 160 which is hydraulically coupled to directional control valve 140. Blocking-bypass valve 160 is a lap fit spool and sleeve hydraulically controlled 4-way, 3-position valve with ten ports 61, 62, 63, 64, 65, 69, 68, 67, 66 and 70, with the operation of each port described in detail hereinbelow in tabular form. The spool of blocking-bypass valve 160 slides linearly in its sleeve as shown by arrow 161 in FIG. 3. Blocking-bypass valve 160 is used to sequence the up and down control pressurization to hydraulic motor 20 in response to a pilot 'up' or 'down' position command. Sequencing is achieved by selective line blocking depending on whether the up or down solenoid valve is energized. When both solenoid valves are de-energized, blocking-bypass valve 160 interconnects hydraulic motor ports 81 and 82 to return. The same condition applies after a hydraulic failure to allow electric motor 22 to take over (backdriving hydraulic motor 20) so as to maintain proper positional control of horizontal stabilizer trim control surface 8 at all times.

Another component of horizontal stabilizer trim controller 4 is a shutoff valve 170 which is hydraulically coupled to blocking-bypass valve 160 as depicted generally in FIG. 3. Shutoff valve 170 is a 2-position spool and sleeve valve with four ports 71, 72, 74 and 73 (FIG. 3), the operation of each port being described in detail hereinbelow in tabular form. Shutoff valve 170 is provided with a spool 171 which slides linearly inside a sleeve 172 as shown generally by arrow 173 in FIGS. 2, 3. Ports 73 and 74 are hydraulically coupled to hydraulic motor ports 82 and 81, respectively, while ports 71 and 72 are hydraulically coupled to ports 70 and 65 of blocking-bypass valve 160. Shutoff valve 170 is used to block hydraulic motor port outlet flow at actuator up and down extreme positions (the actuator being acme threaded output shaft 90). Actuator motion is automatically stopped at these pre-determined positions in accordance with the present invention. Specifically, shutoff valve 170 receives feedback on the linear displacement of acme threaded output shaft 90 by mechanically coupling one end of spool 171 to feedback shaft 126 with the corresponding linear motion of spool 171 shown by arrow 173 in FIG. 2. The mechanical coupling in this case is preferably similar to the mechanical coupling between spool 100 of rate control valve 18 and feedback shaft 126 (FIG. 2). Mechanical feedback for shutoff valve 170 is thus accomplished in the same manner as mechanical feedback for rate control valve 18 with the worm gear set and bevel gear set combination described hereinabove providing the necessary gear reduction to achieve proportional actuator displacement feedback to spool 171 of shutoff valve 170 (FIG. 2). Horizontal stabilizer trim control surface positional feedback to spool 100 of rate control valve 18 and to spool 171 of shutoff valve 170 occurs simultaneously.

As shown in FIG. 3, shutoff valve 170 is provided with an integrated horizontal stabilizer trim control surface position sensor 14 (LVDT, resolver, RVDT or the like) which provides horizontal stabilizer trim control surface angular position readout for in-cockpit pilot reference. Other types of position sensors may be used and/or integrated in a different fashion as long as they serve the intended purpose of the present invention.

Linear actuator motion is automatically stopped at pre-determined up and down extreme positions by blocking flow to hydraulic motor ports 81, 82 which eliminates the need for placing physical stops on acme threaded output shaft 90 or the shutoff valve 170. Placing physical stops on acme threaded output shaft 90 for hydraulic operation would require additional structure and may not function as well as the above-described novel approach. However, during backup electric motor operation, mechanical stops on acme threaded output shaft 90 will be required (just beyond the hydraulic stop positions) to enable horizontal stabilizer trim control surface 8 to stop at maximum-up and maximum-down positions after a hydraulic system failure. An alternative to placing mechanical stops on acme threaded output shaft 90 would be the use of horizontal stabilizer trim control surface position sensor 14 to provide electrical feedback to pilot interface 12 to stop backup electric motor 22 only at the extreme maximum-up and maximum-down positions.

Pilot interface 12 receives electrical input from toggle trim switch 11 and outputs appropriate electrical signals to solenoid valves 150, 152 if backup electric motor 22 is not operational, i.e. during normal hydraulic system operation. In case of hydraulic system failure, pilot interface 12 also receives electrical input from horizontal stabilizer trim control surface position sensor 14 and from an on-board aircraft hydraulic pressure sensor (not shown) placed on the hydraulic system line and outputs appropriate electrical signals to backup electric motor 22 which takes over positional control of horizontal stabilizer trim control surface 8.

In accordance with yet another preferred embodiment of the present invention, a detailed description of hydraulic valve port functions and interconnections for rate control valve 18, directional control valve 140, blocking-bypass valve 160 and shutoff valve 170 is presented herewith in tabular form (Tables 1–4).

TABLE 1

RATE CONTROL VALVE 18 (FIG. 3)

| PORT NUMBER | PORT FUNCTION | INTERCONNECTS WITH | |
|---|---|---|---|
| | | PORT NUMBER | VALVE/MOTOR NUMBER |
| 41 | System return pressure line (to aircraft). Pressure used to load balance spool 100 against opposite return cavity pressure from Port 43 and provides spool lap leak path to return | 43 | 18 (Rate Control Valve) |
| | | 52 | 140 (Directional Control Valve) |
| | | 62, 63 | 160 (Blocking Bypass Valve) |
| | | R | Up Solenoid Valve |
| | | R' | Down Solenoid Valve |
| 42 | Supply pressure/flow inlet to entire system (from aircraft) | P | Up Solenoid Valve |
| | | P' | Down Solenoid Valve |
| 43 | System return pressure line (to aircraft). Pressure used to load balance spool 100 against opposite return cavity pressure from Port 41 and provides spool lap leak path to return | 41 | 18 (Rate Control Valve) |
| | | 52 | 140 (Directional Control Valve) |
| | | 62, 63 | 160 (Blocking Bypass Valve) |
| | | R | Up Solenoid Valve |
| | | R' | Down Solenoid Valve |
| 44 | Controlled pressure/flow exit to system - primary pressure/flow source for entire system | 51, 53 | 140 (Directional Control Valve) |

TABLE 2

DIRECTIONAL CONTROL VALVE 140 (FIG. 3)

| | | INTERCONNECTS WITH | |
|---|---|---|---|
| PORT NUMBER | PORT FUNCTION | PORT NUMBER | VALVE/MOTOR NUMBER |
| 51 | Controlled inlet pressure/flow to entire system (from Rate Control Valve 18) | 44<br>53 | 18<br>140 |
| 52 | System return pressure/flow exit (to aircraft) | 41, 43<br>62, 63<br>R<br>R' | 18<br>160<br>Up Solenoid Valve<br>Down Solenoid Valve |
| 53 | Controlled inlet pressure/flow to entire system (from Rate Control Valve 18) | 44<br>51 | 18<br>140 |
| 54 | Controlled pressure/flow exit to Blocking - Bypass Valve 160 and Shutoff Valve 170 for a down command (from Rate Control Valve 18) | 55<br>61, 70<br>71 | 140<br>160<br>170 |
| 55 | Pressure/flow exit to aircraft system return from Blocking - Bypass Valve 160 and Shutoff Valve 170 for an up or stop command | 54<br>61, 70<br>71 | 140<br>160<br>170 |
| 56 | Pressure/flow exit to aircraft system return from Blocking - Bypass Valve 160 and Shutoff Valve 170 for a down or stop command | 57<br>64, 65<br>72 | 140<br>160<br>170 |
| 57 | Controlled pressure/flow exit to Blocking - Bypass Valve 160 and Shutoff Valve 170 for up command | 56<br>64, 65<br>72 | 140<br>160<br>170 |
| 58 | Spool end chamber - control pressure input from energized up solenoid valve to reposition spool into the up position for an up command and return pressure balance against opposite spool return cavity for a stop command (both solenoids de-energized) | R | Up Solenoid Valve |
| 59 | Spool end chamber - control pressure input from energized down solenoid valve to reposition spool into the down position for a down command and return pressure balance against opposite spool return cavity for a stop command (both solenoids de-energized) | R' | Down Solenoid Valve |

TABLE 3

BLOCKING - BYPASS VALVE 160 (FIG. 3)

| | | INTERCONNECTS WITH | |
|---|---|---|---|
| PORT NUMBER | PORT FUNCTION | PORT NUMBER | VALVE/MOTOR NUMBER |
| 61 | Supply pressure/flow inlet to system for down command - only used when in maximum up position (stopped) for a down command | 54, 55<br>70<br>71 | 140<br>160<br>170 |
| 62 | System return pressure/flow exit (to aircraft) | 63<br>41, 43<br>52<br>R<br>R' | 160<br>18<br>140<br>Up Solenoid Valve<br>Down Solenoid Valve |
| 63 | System return pressure/flow exit (to aircraft) | 62<br>41, 43<br>52<br>R<br>R' | 160<br>18<br>140<br>Up Solenoid Valve<br>Down Solenoid Valve |
| 64 | Supply pressure/flow inlet to system for up command - only used when in maximum down position (stopped) for an up command | 56, 57<br>65<br>72 | 140<br>160<br>170 |
| 65 | Spool end chamber - up command supply pressure inlet from Directional Control. Valve 140 to reposition spool into up command position | 64<br>56, 57<br>72 | 160<br>140<br>170 |
| 66 | Controlled pressure/flow exit to hydraulic motor port 82 for down command | 67<br>73<br>82 | 160<br>170<br>20 (hydraulic motor) |
| 67 | System return pressure/flow exit to aircraft for any stop command. At the maximum up position, where hydraulics has failed, provides hydraulic motor port 82 connection to return (balanced ports 81 and 82) for backup electric motor operation (backdriving hydraulic motor) | 66<br>73<br>82 | 160<br>170<br>20 |
| 68 | System return pressure/flow exit to aircraft for any stop command. At the maximum down position, where hydraulics has failed, provides hydraulic motor port 81 connection to return (balanced ports 81 and 82) for backup electric motor operation (backdriving hydraulic motor) | 69<br>74<br>81 | 160<br>170<br>20 |
| 69 | Controlled pressure/flow exit to hydraulic motor port 81 for up command | 68<br>74<br>81 | 160<br>170<br>20 |
| 70 | Spool end chamber - down command supply pressure inlet from direct control valve 140 to reposition spool into down command position | 61<br>54, 55<br>71 | 160<br>140<br>170 |

TABLE 4

SHUTOFF VALVE 170 (FIG. 3)

| | | INTERCONNECTS WITH | |
|---|---|---|---|
| PORT NUMBER | PORT FUNCTION | PORT NUMBER | VALVE/MOTOR NUMBER |
| 71 | Primary supply pressure/flow inlet to hydraulic motor port 82 for down command (from directional control valve 140) | 73<br>82 | 170<br>20 |
| 72 | Primary supply pressure/flow inlet to hydraulic motor port | 74<br>81 | 170<br>20 |

TABLE 4-continued

SHUTOFF VALVE 170 (FIG. 3)

| PORT NUMBER | PORT FUNCTION | INTERCONNECTS WITH PORT NUMBER | VALVE/MOTOR NUMBER |
|---|---|---|---|
| | 81 for up command (from directional control valve 140) | | |
| 73 | Primary supply pressure/flow exit to hydraulic motor port 82 for down command (from directional control valve 140) | 66, 67 82 | 160 20 |
| 74 | Primary supply pressure/flow exit to hydraulic motor port 81 for up command (from directional control valve 140) | 68, 69 81 | 160 20 |

In accordance with the best mode for practicing the invention, a detailed description of several operational modes of the present invention follows hereinbelow in tabular form (Tables 5–39).

Operational Mode 1

Stop Command—Pilot Command to Stop the Horizontal Stabilizer Trim Control Surface at any Desired Position throughout the Actuator Stroke

TABLE 5

| | | TOGGLE SWITCH POSITION | NEUTRAL |
|---|---|---|---|
| | | UP SOLENOID | DE-ENERGIZED |
| | | DOWN SOLENOID | DE-ENERGIZED |
| OUTPUT SHAFT AND Horizontal stabilizer trim control surface | | MOTION POSITION | STOPPED INTERMEDIATE |
| HYDRAULIC MOTOR | PORT PRESSURE CONDITION | PORT 81 (UP) PORT 82 (DOWN) | UNPRESSURIZED UNPRESSURIZED |
| | PORT FLOW CONDITION | PORT 81 (UP) | NO INLET OR EXIT FLOW (BLOCKED AT DIRECTIONAL CONTROL VALVE 140) |
| | | PORT 82 (DOWN) | NO INLET OR EXIT FLOW (BLOCKED AT DIRECTIONAL CONTROL VALVE 140) |

TABLE 6

RATE CONTROL VALVE

| VALVE SPOOL | | | VALVE PORT PORT NUMBER | | | |
|---|---|---|---|---|---|---|
| MOTION | POSITION | PRESSURE CONDITION | 41 | 42 | 43 | 44 |
| STOPPED | INTERMEDIATE | PRESSURIZED | | x | | x |
| | | UNPRESSURIZED | x | | x | |

TABLE 7

DIRECTIONAL CONTROL VALVE

| VALVE SPOOL | | | VALVE PORT PORT NUMBER | | | | | | | | |
|---|---|---|---|---|---|---|---|---|---|---|---|
| MOTION | POSITION | PRESSURE CONDITION | 51 | 52 | 53 | 54 | 55 | 56 | 57 | 58 | 59 |
| STOPPED | NEUTRAL - SPRING CENTERED | PRESSURIZED | x | | x | | | | x | | |
| | | UNPRESSURIZED | | x | | x | x | x | | | x |

TABLE 8

BLOCKING-BYPASS VALVE

| VALVE SPOOL | | | VALVE PORT / PORT NUMBER | | | | | | | | | |
|---|---|---|---|---|---|---|---|---|---|---|---|---|
| MOTION | POSITION | PRESSURE CONDITION | 61 | 62 | 63 | 64 | 65 | 66 | 67 | 68 | 69 | 70 |
| STOPPED | NEUTRAL - SPRING CENTERED | PRESSURIZED UNPRESSURIZED | x | x | x | x | x | x | x | x | x | x |

TABLE 9

SHUTOFF VALVE

| VALVE SPOOL | | | VALVE PORT / PORT NUMBER | | | |
|---|---|---|---|---|---|---|
| MOTION | POSITION | PRESSURE CONDITION | 71 | 72 | 73 | 74 |
| STOPPED | INTERMEDIATE | PRESSURIZED UNPRESSURIZED | x | x | x | x |

Operational Mode 2
Up Command—Pilot Command to Move the Horizontal Stabilizer Trim Control Surface in the Up Direction

TABLE 10

| | |
|---|---|
| TOGGLE SWITCH POSITION | UP |
| UP SOLENOID | ENERGIZED |
| DOWN SOLENOID | DE-ENERGIZED |
| OUTPUT SHAFT AND Horizontal stabilizer trim control surface | MOTION  MOVING UP<br>POSITION  INTERMEDIATE |
| HYDRAULIC MOTOR  PORT PRESSURE CONDITION | PORT 81 (UP)  PRESSURIZED<br>PORT 82 (DOWN)  UNPRESSURIZED |
| PORT FLOW CONDITION | PORT 81 (UP)  FLOWING IN<br>(RATE OF FLOW DETERMINED BY RATE CONTROL VALVE 140)<br>PORT 82 (DOWN)  FLOWING OUT<br>(RATE OF FLOW DETERMINED BY RATE CONTROL VALVE 140) |

TABLE 11

RATE CONTROL VALVE

| VALVE SPOOL | | | VALVE PORT / PORT NUMBER | | | |
|---|---|---|---|---|---|---|
| MOTION | POSITION | PRESSURE CONDITION | 41 | 42 | 43 | 44 |
| MOVING UP | INTERMEDIATE | PRESSURIZED | | x | | x |
| | | UNPRESSURIZED | x | | x | |

TABLE 12

DIRECTIONAL CONTROL VALVE

| VALVE SPOOL | | | VALVE PORT / PORT NUMBER | | | | | | | | |
|---|---|---|---|---|---|---|---|---|---|---|---|
| MOTION | POSITION | PRESSURE CONDITION | 51 | 52 | 53 | 54 | 55 | 56 | 57 | 58 | 59 |
| STOPPED | FULL STROKE UP | PRESSURIZED | x | | x | | | x | x | x | |
| | | UNPRESSURIZED | | x | | x | x | | | | x |

TABLE 13

BLOCKING-BYPASS VALVE

| VALVE SPOOL | | | VALVE PORT PORT NUMBER | | | | | | | | | |
|---|---|---|---|---|---|---|---|---|---|---|---|---|
| MOTION | POSITION | PRESSURE CONDITION | 61 | 62 | 63 | 64 | 65 | 66 | 67 | 68 | 69 | 70 |
| STOPPED | FULL STROKE UP | PRESSURIZED | | | | | x | x | | x | x | |
| | | UNPRESSURIZED | x | x | x | | | | x | x | | x |

TABLE 14

SHUTOFF VALVE

| VALVE SPOOL | | | VALVE PORT PORT NUMBER | | | |
|---|---|---|---|---|---|---|
| MOTION | POSITION | PRESSURE CONDITION | 71 | 72 | 73 | 74 |
| MOVING | INTERMEDIATE | PRESSURIZED | | x | | x |
| | | UNPRESSURIZED | x | | x | |

Operational Mode 3
Maximum Up Command—Pilot Maintains Up Command to Move to and Automatically Stop at the Horizontal Stabilizer Trim Control Surface Maximum Up Position

TABLE 15

| | | |
|---|---|---|
| TOGGLE SWITCH POSITION | | UP |
| UP SOLENOID | | ENERGIZED |
| DOWN SOLENOID | | DE-ENERGIZED |
| OUTPUT SHAFT AND | MOTION | STOPPED (AUTOMATICALLY) |
| Horizontal stabilizer trim control surface | POSITION | MAXIMUM UP |
| HYDRAULIC MOTOR    PORT PRESSURE CONDITION | PORT 81 (UP) | PRESSURIZED |
| | PORT 82 (DOWN) | UNPRESSURIZED |
| PORT FLOW CONDITION | PORT 81 (UP) | NO INLET FLOW |
| | PORT 82 (DOWN) | NO EXIT FLOW |
| | | (BLOCKED AT SHUTOFF VALVE 170 |
| | | AND BLOCKING-BYPASS VALVE 160) |

TABLE 16

RATE CONTROL VALVE

| VALVE SPOOL | | | VALVE PORT PORT NUMBER | | | |
|---|---|---|---|---|---|---|
| MOTION | POSITION | PRESSURE CONDITION | 41 | 42 | 43 | 44 |
| STOPPED | PULL STROKE UP | PRESSURIZED | | x | | x |
| | | UNPRESSURIZED | x | | x | |

TABLE 17

DIRECTIONAL CONTROL VALVE

| VALVE SPOOL | | | VALVE PORT PORT NUMBER | | | | | | | | |
|---|---|---|---|---|---|---|---|---|---|---|---|
| MOTION | POSITION | PRESSURE CONDITION | 51 | 52 | 53 | 54 | 55 | 56 | 57 | 58 | 59 |
| STOPPED | FULL STROKE UP | PRESSURIZED | x | | x | | | x | x | x | |
| | | UNPRESSURIZED | | x | | x | x | | | | x |

TABLE 18

BLOCKING-BYPASS VALVE

| VALVE SPOOL | | | \multicolumn{10}{c}{VALVE PORT — PORT NUMBER} |
|---|---|---|---|

| MOTION | POSITION | PRESSURE CONDITION | 61 | 62 | 63 | 64 | 65 | 66 | 67 | 68 | 69 | 70 |
|---|---|---|---|---|---|---|---|---|---|---|---|---|
| STOPPED | FULL STROKE UP | PRESSURIZED | | | | x | x | | | x | x | |
| | | UNPRESSURIZED | x | x | x | | | x | x | | | x |

TABLE 19

SHUTOFF VALVE

| VALVE SPOOL | | | \multicolumn{4}{c}{VALVE PORT — PORT NUMBER} |
|---|---|---|---|

| MOTION | POSITION | PRESSURE CONDITION | 71 | 72 | 73 | 74 |
|---|---|---|---|---|---|---|
| STOPPED | FULL STROKE UP | PRESSURIZED | | x | | x |
| | | UNPRESSURIZED | x | | x | |

Operational Mode 4
Down Command from Maximum Up position—Pilot Command to Start the Horizontal Stabilizer Trim Control Surface Moving Down from the Maximum Up Stopped Position

TABLE 20

| | | |
|---|---|---|
| TOGGLE SWITCH POSITION | | DOWN |
| UP SOLENOID | | DE-ENERGIZED |
| DOWN SOLENOID | | ENERGIZED |
| OUTPUT SHAFT AND | MOTION | MOVING DOWN |
| Horizontal stabilizer trim control surface | POSITION | INTERMEDIATE |
| HYDRAULIC MOTOR  PORT PRESSURE CONDITION | PORT 81 (UP) | UNPRESSURIZED |
| | PORT 82 (DOWN) | PRESSURIZED |
| PORT FLOW CONDITION | PORT 81 (UP) | FLOWING OUT |
| | PORT 82 (DOWN) | FLOWING IN (THROUGH BLOCKING-BYPASS VALVE 160) |

TABLE 21

RATE CONTROL VALVE

| VALVE SPOOL | | | \multicolumn{4}{c}{VALVE PORT — PORT NUMBER} |
|---|---|---|---|

| MOTION | POSITION | PRESSURE CONDITION | 41 | 42 | 43 | 44 |
|---|---|---|---|---|---|---|
| MOVING DOWN | FULL STROKE UP AT START | PRESSURIZED | | x | | x |
| | | UNPRESSURIZED | x | | x | |

TABLE 22

DIRECTIONAL CONTROL VALVE

| VALVE SPOOL | | | \multicolumn{9}{c}{VALVE PORT — PORT NUMBER} |
|---|---|---|---|

| MOTION | POSITION | PRESSURE CONDITION | 51 | 52 | 53 | 54 | 55 | 56 | 57 | 58 | 59 |
|---|---|---|---|---|---|---|---|---|---|---|---|
| STOPPED | FULL STROKE DOWN | PRESSURIZED | x | | x | x | x | | | | x |
| | | UNPRESSURIZED | | x | | | | x | x | x | |

TABLE 23

BLOCKING-BYPASS VALVE

| VALVE SPOOL | | | VALVE PORT / PORT NUMBER | | | | | | | | | |
|---|---|---|---|---|---|---|---|---|---|---|---|---|
| MOTION | POSITION | PRESSURE CONDITION | 61 | 62 | 63 | 64 | 65 | 66 | 67 | 68 | 69 | 70 |
| STOPPED | FULL STROKE DOWN | PRESSURIZED | x | | | | | x | x | | | x |
| | | UNPRESSURIZED | | x | x | x | x | | | x | x | |

TABLE 24

SHUTOFF VALVE

| VALVE SPOOL | | | VALVE PORT / PORT NUMBER | | | |
|---|---|---|---|---|---|---|
| MOTION | POSITION | PRESSURE CONDITION | 71 | 72 | 73 | 74 |
| MOVING | FULL STROKE UP AT START | PRESSURIZED | x | | x | |
| | | UNPRESSURIZED | | x | | x |

Operational Mode 5
Down Command—Pilot Command to Move the Horizontal
Stabilizer Trim Control Surface in the Down Direction

TABLE 25

| TOGGLE SWITCH POSITION | | | DOWN |
|---|---|---|---|
| UP SOLENOID | | | DE-ENERGIZED |
| DOWN SOLENOID | | | ENERGIZED |
| OUTPUT SHAFT AND | | MOTION | MOVING DOWN |
| Horizontal stabilizer trim control surface | | POSITION | INTERMEDIATE |
| HYDRAULIC MOTOR | PORT PRESSURE CONDITION | PORT 81 (UP) | UNPRESSURIZED |
| | | PORT 82 (DOWN) | PRESSURIZED |
| | PORT FLOW CONDITION | PORT 81 (UP) | FLOWING OUT |
| | | PORT 82 (DOWN) | FLOWING IN (THROUGH BLOCKING-BYPASS VALVE 160 AND SHUTOFF VALVE 170) |

TABLE 26

RATE CONTROL VALVE

| VALVE SPOOL | | | VALVE PORT / PORT NUMBER | | | |
|---|---|---|---|---|---|---|
| MOTION | POSITION | PRESSURE CONDITION | 41 | 42 | 43 | 44 |
| MOVING DOWN | INTERMEDIATE | PRESSURIZED | | x | | x |
| | | UNPRESSURIZED | x | | x | |

TABLE 27

DIRECTIONAL CONTROL VALVE

| VALVE SPOOL | | | VALVE PORT / PORT NUMBER | | | | | | | | |
|---|---|---|---|---|---|---|---|---|---|---|---|
| MOTION | POSITION | PRESSURE CONDITION | 51 | 52 | 53 | 54 | 55 | 56 | 57 | 58 | 59 |
| STOPPED | FULL STROKE DOWN | PRESSURIZED | x | | x | x | x | | | x | |
| | | UNPRESSURIZED | | x | | | | x | x | | x |

TABLE 28

BLOCKING-BYPASS VALVE

| VALVE SPOOL | | | VALVE PORT / PORT NUMBER | | | | | | | | | |
|---|---|---|---|---|---|---|---|---|---|---|---|---|
| MOTION | POSITION | PRESSURE CONDITION | 61 | 62 | 63 | 64 | 65 | 66 | 67 | 68 | 69 | 70 |
| STOPPED | FULL STROKE DOWN | PRESSURIZED | x | | | | | x | x | | | x |
| | | UNPRESSURIZED | | x | x | x | x | | | x | x | |

TABLE 29

SHUTOFF VALVE

| VALVE SPOOL | | | VALVE PORT / PORT NUMBER | | | |
|---|---|---|---|---|---|---|
| MOTION | POSITION | PRESSURE CONDITION | 71 | 72 | 73 | 74 |
| MOVING | INTERMEDIATE | PRESSURIZED | x | | x | |
| | | UNPRESSURIZED | | x | | x |

Operational Mode 6
Maximum Down Command—Pilot Maintains Down Command to Move to and Automatically Stop at the Horizontal Stabilizer Trim Control Surface Maximum Down Position

TABLE 30

| | | |
|---|---|---|
| TOGGLE SWITCH POSITION | | DOWN |
| UP SOLENOID | | DE-ENERGIZED |
| DOWN SOLENOID | | ENERGIZED |
| OUTPUT SHAFT AND | MOTION | STOPPED (AUTOMATICALLY) |
| Horizontal stabilizer trim control surface | POSITION | MAXIMUM DOWN |
| HYDRAULIC MOTOR  PORT PRESSURE CONDITION | PORT 81 (UP) | UNPRESSURIZED |
| | PORT 82 (DOWN) | PRESSURIZED |
| PORT FLOW CONDITION | PORT 81 (UP) | NO EXIT FLOW (BLOCKED AT SHUTOFF VALVE 170 AND BLOCKING-BYPASS VALVE 160) |
| | PORT 82 (DOWN) | NO INLET FLOW |

TABLE 31

RATE CONTROL VALVE

| VALVE SPOOL | | | VALVE PORT / PORT NUMBER | | | |
|---|---|---|---|---|---|---|
| MOTION | POSITION | PRESSURE CONDITION | 41 | 42 | 43 | 44 |
| STOPPED | FULL STROKE DOWN | PRESSURIZED | | x | | x |
| | | UNPRESSURIZED | x | | x | |

TABLE 32

DIRECTIONAL CONTROL VALVE

| VALVE SPOOL | | | VALVE PORT / PORT NUMBER | | | | | | | | |
|---|---|---|---|---|---|---|---|---|---|---|---|
| MOTION | POSITION | PRESSURE CONDITION | 51 | 52 | 53 | 54 | 55 | 56 | 57 | 58 | 59 |
| STOPPED | FULL STROKE DOWN | PRESSURIZED | x | | x | x | x | | | x | |
| | | UNPRESSURIZED | | x | | | | x | x | | x |

TABLE 33

BLOCKING-BYPASS VALVE

| VALVE SPOOL | | | VALVE PORT PORT NUMBER | | | | | | | | | |
|---|---|---|---|---|---|---|---|---|---|---|---|---|
| MOTION | POSITION | PRESSURE CONDITION | 61 | 62 | 63 | 64 | 65 | 66 | 67 | 68 | 69 | 70 |
| STOPPED | FULL STROKE DOWN | PRESSURIZED | x | | | | | x | x | | | x |
| | | UNPRESSURIZED | | x | x | x | x | | | x | x | |

TABLE 34

SHUTOFF VALVE

| VALVE SPOOL | | | VALVE PORT PORT NUMBER | | | |
|---|---|---|---|---|---|---|
| MOTION | POSITION | PRESSURE CONDITION | 71 | 72 | 73 | 74 |
| STOPPED | FULL STROKE DOWN | PRESSURIZED | x | | x | |
| | | UNPRESSURIZED | | x | | x |

Operational Mode 7
Up Command from Maximum Down Position—Pilot Command to Start the Horizontal Stabilizer Trim Control Surface Moving Up from the Maximum Down Stopped Position

TABLE 35

| | | |
|---|---|---|
| TOGGLE SWITCH POSITION | | UP |
| UP SOLENOID | | ENERGIZED |
| DOWN SOLENOID | | DE-ENERGIZED |
| OUTPUT SHAFT AND | MOTION | MOVING UP |
| Horizontal stabilizer trim control surface | POSITION | INTERMEDIATE |
| HYDRAULIC MOTOR PORT PRESSURE CONDITION | PORT 81 (UP) | PRESSURIZED |
| | PORT 82 (DOWN) | UNPRESSURIZED |
| PORT FLOW CONDITION | PORT 81 (UP) | FLOWING IN |
| | PORT 82 (DOWN) | FLOWING OUT (THROUGH BLOCKING-BYPASS VALVE 160) |

TABLE 36

RATE CONTROL VALVE

| VALVE SPOOL | | | VALVE PORT PORT NUMBER | | | |
|---|---|---|---|---|---|---|
| MOTION | POSITION | PRESSURE CONDITION | 41 | 42 | 43 | 44 |
| MOVING UP | MAXIMUM STROKE DOWN AT START | PRESSURIZED | | x | | x |
| | | UNPRESSURIZED | x | | x | |

TABLE 37

DIRECTIONAL CONTROL VALVE

| VALVE SPOOL | | | VALVE PORT PORT NUMBER | | | | | | | | | |
|---|---|---|---|---|---|---|---|---|---|---|---|---|
| MOTION | POSITION | PRESSURE CONDITION | 51 | 52 | 53 | 54 | 55 | 56 | 57 | 58 | 59 | |
| STOPPED | FULL STROKE UP | PRESSURIZED | x | | x | | | x | x | x | | |
| | | UNPRESSURIZED | | x | | x | x | | | | x | |

TABLE 38

BLOCKING-BYPASS VALVE

| VALVE SPOOL | | | VALVE PORT — PORT NUMBER | | | | | | | | | |
|---|---|---|---|---|---|---|---|---|---|---|---|---|
| MOTION | POSITION | PRESSURE CONDITION | 61 | 62 | 63 | 64 | 65 | 66 | 67 | 68 | 69 | 70 |
| STOPPED | FULL STROKE UP | PRESSURIZED | | | | x | x | | | x | x | |
| | | UNPRESSURIZED | x | x | x | | | x | x | | | x |

TABLE 39

SHUTOFF VALVE

| VALVE SPOOL | | | VALVE PORT — PORT NUMBER | | | |
|---|---|---|---|---|---|---|
| MOTION | POSITION | PRESSURE CONDITION | 71 | 72 | 73 | 74 |
| MOVING | FULL STROKE DOWN AT START | PRESSURIZED | | x | | x |
| | | UNPRESSURIZED | x | | x | |

The above-described invention provides a reliable all-hydraulic horizontal stabilizer trim control system which may be utilized in a variety of fixed-wing aircraft. While the present invention has been described in detail with regards to the preferred embodiments, it should be appreciated that various modifications and variations may be made in the present invention without departing from the scope or spirit of the invention. For example, the backup electrical motor and pilot interface may be eliminated if desired without departing from the intended purpose of the present invention. Other system embodiments may be possible, however, it is important to note that practicing the invention is not limited to the applications described herein above. Many other applications and/or alterations may be utilized provided that such applications and/or alterations do not depart from the intended purpose of the present invention.

It should also be appreciated by a person skilled in the art that features illustrated or described as part of one embodiment can be used in another embodiment to provide yet another embodiment such that the features are not limited to the specific embodiments described above. Thus, it is intended that the present invention cover such modifications, embodiments and variations as long as they come within the scope of the appended claims and their equivalents.

What is claimed is:

1. A horizontal stabilizer trim control surface position control system for use by a pilot on an aircraft, comprising:
   (a) a trim controller for controlling the angular position of the horizontal stabilizer trim control surface on command by the pilot, said trim controller powered substantially by pressurized hydraulic fluid, said trim controller including a plurality of spool-and-sleeve hydraulic valves, each of said spool-and-sleeve hydraulic valves having a plurality of inlet and outlet ports for flowing pressurized hydraulic fluid;
   (b) a trim actuator operatively coupled between said trim controller and the horizontal stabilizer trim control surface for adjusting the angular position of the horizontal stabilizer trim control surface on command by the pilot, said trim actuator driven by said trim controller; and
   (c) means for providing feedback on the angular position of the horizontal stabilizer trim control surface to the pilot.

2. The horizontal trim control surface position control system of claim 1, wherein said plurality of spool-and-sleeve hydraulic valves includes a rate control valve, a directional control valve hydraulically coupled to said rate control valve, a blocking-bypass valve hydraulically coupled to said directional control valve and a shutoff valve hydraulically coupled to said blocking-bypass valve, said rate control valve operatively coupled to on-board aircraft hydraulic system supply and return lines.

3. The horizontal stabilizer trim control surface position control system of claim 2, further comprising means for driving said directional control valve.

4. The horizontal stabilizer trim control surface position control system of claim 3, wherein said directional control valve driving means includes a first solenoid valve operatively coupled to one end of said directional control valve and a second solenoid valve operatively coupled to another end of said directional control valve, said first and second solenoid valves actuated by the pilot.

5. The horizontal stabilizer trim control surface position control system of claim 4, further comprising means for actuating said first solenoid valve and said second solenoid valve by the pilot.

6. The horizontal stabilizer trim control surface position control system of claim 5, wherein said actuating means includes a toggle trim switch for selectively actuating said first solenoid valve and said second solenoid valve by the pilot through a pilot interface operatively coupled between said toggle trim switch and said first and second solenoid valves, said toggle trim switch and said pilot interface powered by an on-board aircraft power source.

7. The horizontal stabilizer trim control surface position control system of claim 6, wherein said trim actuator comprises at least one motor having a motor shaft, a first gear train driven by said motor shaft and means for adjusting the angular position of the horizontal stabilizer trim control surface on command by the pilot.

8. The horizontal stabilizer trim control surface position control system of claim 7, wherein said angular position adjusting means includes an output shaft operatively coupled between the horizontal stabilizer trim control surface and said first gear train, said output shaft driven by said first gear train, said driven output shaft having linear displacement, said linear displacement adjusting the angular position of the horizontal stabilizer trim control surface on command by the pilot.

9. The horizontal stabilizer trim control surface position control system of claim 8, wherein said at least one motor is a hydraulic motor having a first motor port and a second motor port, said first and second motor ports hydraulically coupled to some of the ports of said shutoff valve, said shutoff valve controlling the flow of pressurized hydraulic fluid to said first and second motor ports.

10. The horizontal stabilizer trim control surface position control system of claim 9, wherein said first gear train comprises at least one pinion gear driven by said motor shaft of said hydraulic motor, it least one spur gear driven by said at least one pinion gear and a first worm gear set driven by said at least one spur gear.

11. The horizontal stabilizer trim control surface position control system of claim 10, wherein said first worm gear set comprises a worm driven by said at least one spur gear and a worm gear driven by said worm, said output shaft driven by said worm gear, said output shaft linear displacement resulting from said worm gear driving said output shaft.

12. The horizontal stabilizer trim control surface position control system of claim 11, further comprising means for providing feedback on the angular position of the horizontal stabilizer trim control surface to said rate control valve.

13. The horizontal stabilizer trim control surface position control system of claim 12, wherein said rate control valve feedback means includes a second gear train driven by said first gear train and operatively coupled to a feedback shaft, said feedback shaft coupled to the spool of said rate control valve for linearly displacing the spool of said rate control valve inside the sleeve of said rate control valve substantially in proportion to said linear displacement of said output shaft.

14. The horizontal stabilizer trim control surface position control system of claim 13, wherein said second gear train comprises a bevel gear set driven by said first gear train and a second worm gear set driven by said bevel gear set, said feedback shaft driven by said second worm gear set.

15. The horizontal stabilizer trim control surface position control system of claim 14, wherein said bevel gear set comprises a first bevel gear driven by said worm gear and a second bevel gear driven by said first bevel gear.

16. The horizontal stabilizer trim control surface position control system of claim 15, wherein said second worm gear set comprises a second worm driven by said second bevel gear and a worm gear segment operatively coupled between said second worm and said feedback shaft for driving said feedback shaft substantially in proportion to said linear displacement of said output shaft.

17. The horizontal stabilizer trim control surface position control system of claim 16, further comprising means for controlling the flow rate of pressurized hydraulic fluid to said first and second motor ports of said hydraulic motor.

18. The horizontal stabilizer trim control surface position control system of claim 17, wherein said flow rate control means includes a groove on the spool of said rate control valve for passing outflowing pressurized hydraulic fluid from the spool and at least one outlet flow slot on the sleeve of said rate control valve for accommodating said outflowing pressurized hydraulic fluid from said spool groove, said at least one sleeve outlet flow slot providing a variable pressurized hydraulic fluid outflow area for varying the pressurized hydraulic fluid flow rate to said first and second motor ports of said hydraulic motor substantially in proportion to the angular rate of displacement of the horizontal stabilizer trim control surface.

19. The horizontal stabilizer trim control surface position control system of claim 18, further comprising means for providing feedback on the angular position of the horizontal stabilizer trim control surface to said shutoff valve.

20. The horizontal stabilizer trim control surface position control system of claim 19, wherein said shutoff valve feedback means includes said second gear train driven by said first gear train and operatively coupled to said feedback shaft, said feedback shaft coupled to the spool of said shutoff valve for linearly displacing the spool of said shutoff valve inside the sleeve of said shutoff valve substantially in proportion to said linear displacement of said output shaft.

21. The horizontal stabilizer trim control surface position control system of claim 20, wherein said means for providing feedback on the angular position of the horizontal stabilizer trim control surface to the pilot includes a horizontal stabilizer trim control surface position sensor operatively coupled to the spool of said shutoff valve, said horizontal stabilizer trim control surface position sensor powered by an on-board aircraft power source.

22. The horizontal stabilizer trim control surface position control system of claim 8, wherein said at least one motor is a backup electric motor for use during loss of hydraulic system supply pressure, said pilot interface automatically actuating said backup electric motor during loss of hydraulic system supply pressure, said backup electric motor powered by an on-board aircraft power source.

23. The horizontal stabilizer trim control surface position control system of claim 22, wherein said first gear train comprises at least one pinion gear driven by said motor shaft of said backup electric motor, at least one spur gear driven by said at least one pinion gear and a first worm gear set driven by said at least one spur gear.

24. The horizontal stabilizer trim control surface position control system of claim 23, wherein said first worm gear set comprises a worm driven by said at least one spur gear and a worm gear driven by said worm, said output shaft driven by said worm gear, said driven output shaft having linear displacement caused by said worm gear driving said output shaft.

25. A horizontal stabilizer trim control surface position control system for use by a pilot on an aircraft, comprising:
(a) a trim controller for controlling the angular position of the horizontal stabilizer trim control surface on command by the pilot, said trim controller powered only by pressurized hydraulic fluid during normal operation;
(b) a trim actuator operatively coupled between said trim controller and the horizontal stabilizer trim control surface for adjusting the angular position of the horizontal stabilizer trim control surface on command by the pilot, said trim actuator driven by said trim controller;

(c) means for providing feedback on the angular position of the horizontal stabilizer trim control surface to the pilot; and (d) means for automatically stopping the horizontal trim control surface at predetermined maximum-up and maximum-down positions without the use of mechanical stops.

* * * * *